J. B. MULLAY.
SAW FILER.
APPLICATION FILED OCT. 30, 1913.
1,121,120.
Patented Dec. 15, 1914.
2 SHEETS—SHEET 1.
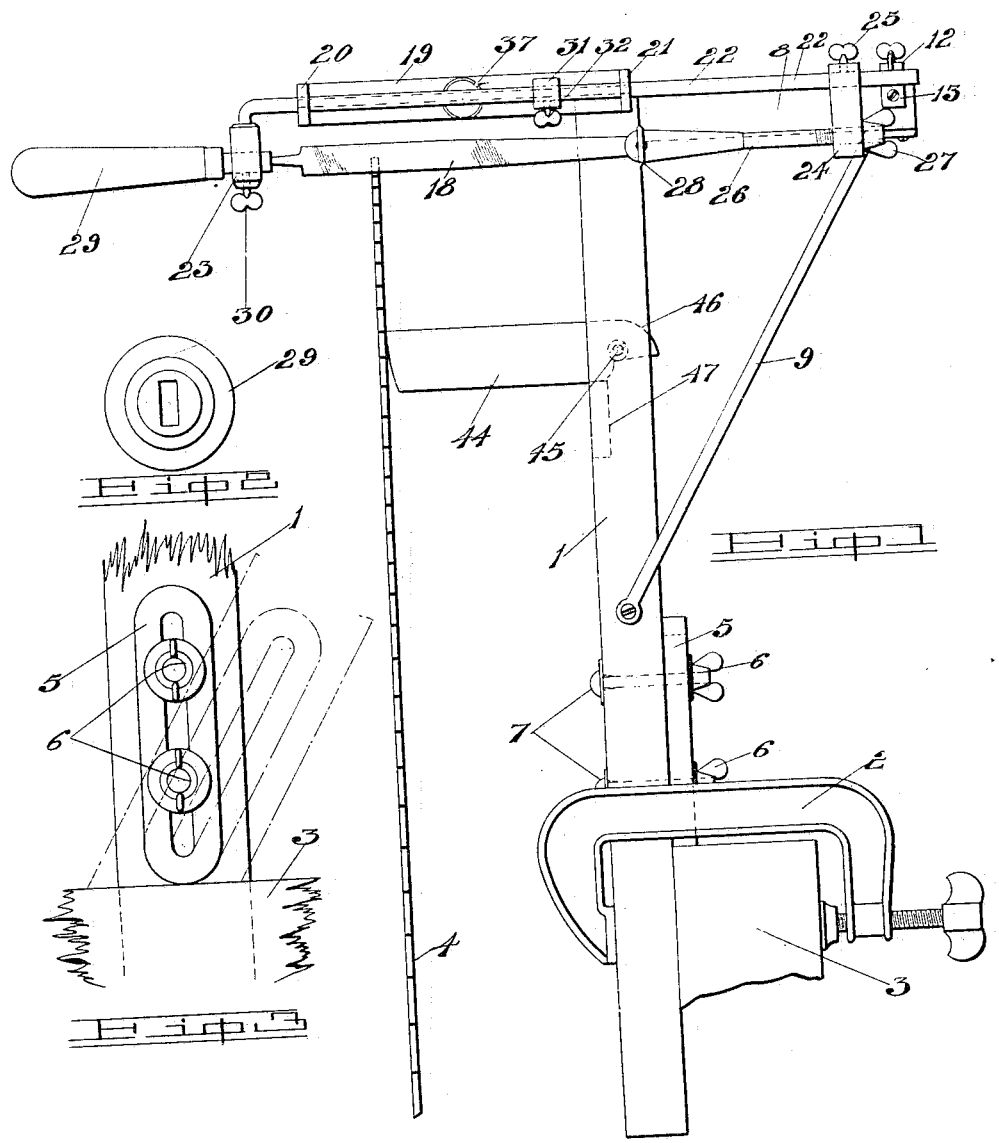

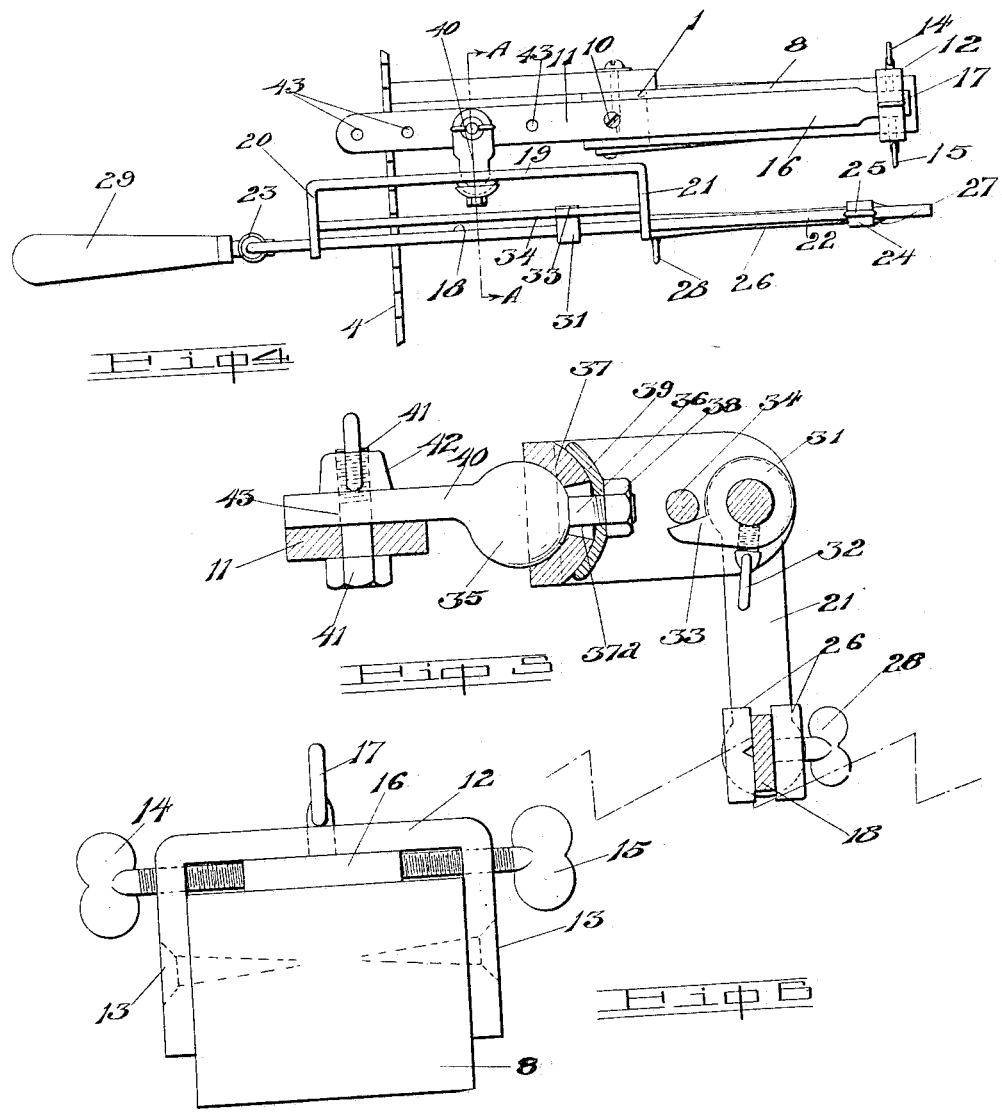

UNITED STATES PATENT OFFICE.

JAMES B. MULLAY, OF PORTLAND, OREGON.

SAW-FILER.

1,121,120.

Specification of Letters Patent. Patented Dec. 15, 1914.

Application filed October 30, 1913. Serial No. 798,218.

*To all whom it may concern:*

Be it known that I, JAMES B. MULLAY, a citizen of the United States, residing at Portland, in the county of Multnomah and State of Oregon, have invented certain new and useful Improvements in Saw-Filers, of which the following is a specification.

My invention relates to saw filing apparatus and has for its object the production of a device which, being susceptible of being adjusted to use within the entire range of practical limits as to size of saw, is adapted to be used successfully in filing saws generally and especially heavy cross cut saws, which require ordinarily the skill of a good workman developed by long experience to produce results in any wise satisfactory.

By my invention not only are the best results rendered attainable by the exercise of ordinary workmanlike skill in its use, but by reason thereby of the wide and delicate range of adjustment of the file proper a uniformity of treatment may be arrived at, which surpasses that of the best trained hand.

What constitutes my invention will be hereinafter specified in detail and succinctly set forth in the appended claims.

In the accompanying drawings: Figure 1 is a side elevation of my apparatus complete set up and applied as in use. Fig. 2 is a detail view from Fig. 1. Fig. 3 is a view of another detail. Fig. 4 is a top plan view of the subject matter of Fig. 1, lacking one or two accessories. Fig. 5 is a section on the line A—A of Fig. 4. Fig. 6 is a detail end view taken from Fig. 4 to show the clamping yoke for the tail piece of the swinging arm.

Referring to the numerals on the drawings, 1 indicates an upright, which, being of any suitable and preferred material and dimensions, is adapted to be secured by any suitable means, as, for example, a clamp 2 to a guide rail 3 that is located within operative juxtaposition to and by preference in substantial longitudinal coextension with a saw blade 4. The office of the rail 3 is to allocate my device to its work, in respect to which it proceeds in step by step adjustment lengthwise of the rail 3, through manipulation, as often as required, of the clamp 2. The function referred to may be performed by any available strip of wood, for instance, which will answer the purpose, as the saw mill frame. To facilitate setting the upright to place in successive step by step adjustments of it upon the rail 3 an adjustable stop piece 5 on the upright may be fixed as by wing nuts 6 screwing upon through-going bolts 7. The stop piece 5 when once adjusted, serves to fix approximately the set of the apparatus to the succeeding adjustment with a minimum of attention.

The upright 1 is surmounted by a fixed arm 8, whose rigidity of connection with the upright is supplemented by a diagonal beam 9. The upright 1 and its arm 8 constitute a supporting frame to which is pivoted preferably above the junction of arm and upright, as indicated at 10, a swinging arm 11 which in operative adjustment to its work moves in a horizontal plane transverse to the saw blade 4, and is adjustable to set positions in said plane. For the purpose of such adjustment, I prefer to employ a clamping yoke 12 which being secured as by screws 13 to the fixed arm 8 is provided upon opposite sides with wing bolts 14 and 15 which oppositely impinge against the sides of the tail piece 16 of the arm 11 and afford through their opposing relative movements accurate and positive means of adjustment to the arm 11. The adjustment, so obtained, may be fixed even more positively than by the wing screws 14—15, by a winged set screw 17 let into the yoke 12 against the tail piece 16. It is the office of the arm 11 to carry for adjustable preservation to the work required of it upon the saw blade 4 an abrasive member or file 18. The function of the file demands for its work a wide range of adjustability both in a horizontal plane which is in part provided for in the swinging arm 11, and in various planes at angles to the horizontal plane. The extent of such adjustability as is required is such as to be better understood in the art of saw filing than it would be practicable to set forth or necessary to attempt in this specification addressed, as it is, to one skilled in that art.

Accordingly, it is deemed to be sufficient herein to specify that to accommodate it to the successful attainment of all functions required of it in service, the file 18 is provided with means of universal definite adjustability throughout the limit of its sphere of operation. To those ends I insert the file operatively in a preferably rectangular frame comprising a reach 19 and terminals 20—21, as clearly shown in Figs. 1 and 4. Within said frame the file is fixed upon a sliding carrier whose functional element is a rod 22 that reciprocates freely through coaxial bearing apertures provided for it in the terminals 20—21. For detachably securing the file in place in its carrier, suitable mechanism is provided, as, for example and for its simplicity preferred, a head collar 23 and a tail collar 24, the latter adjustable to accommodate different lengths of files endwise of the rod 22, as by an abutment screw 25. The tail collar carries a file prehensile member 26 whose one end penetrates an aperture in the tail collar that loosely accommodates it and is threaded to a winged tension nut 27, which, working on the threads of the prehensile member, 26, in practice, serves to stiffen that member in alinement with the file 18. Accordingly the prehensile member 26 is split so as to clamp the tail of the file under control of a wing screw 28, the neck of the file handle 29 being secured within the head collar 23, as by an abutment screw 30.

The sliding carrier has a vertical swing upon the rod 22 for its axis, and the limit of its descent is the measure of the depth of cut in practice of the file 18 into the saw blade 4. It being important to gage such depth of cut, my invention provides depth-gage-mechanism, consisting preferably of a collar 31, adjustable upon and about the rod 22 as by aid of an abutment screw 32, and provided with a stop-lug 33, extending radially in the path of a stop piece 34 extending from end to end of the carrier as in the form of a rod fixed at opposite ends in the terminals 20—21 respectively. In practice, the fixing of the adjustment of the collar 31 endwise of the rod 22 determines the reciprocatory movement of the file 18 under manipulation of its handle 29, while the radial adjustment of the collar in respect to its lug 33 limits the depth of the cut of the file.

For promoting requisite adjustability I prefer to secure the reach 19 of the rectangular frame to the arm 11 by a ball-joint comprising a convex member 35 having a stud bolt 36 which passes through a wide aperture 37ª in the concave 37 provided in the reach, and is fastened in place as by a nut 38 that actuates a cap-washer 39. For further adjustment the convex member 35, which is provided with a shank 40, is attached to the arm 11 as by aid of a bolt 41 and its nut 42, the bolt being adapted to take into any one of a series of apertures 43 disposed in series endwise of the arm 11.

It will appear that the triplex means of adjustably uniting the sliding carrier and the supporting frame comprising arm 11, shank 40, the ball-joint and their several connecting members afford a unity of adjustment, for my requirements of service, which is substantially unlimited. It should be observed, moreover, that the depth-cut-gage referred to above is equally operative in all of such adjustments.

To prevent chattering of the saw blade 4 under the rake of the file, I prefer to provide an abutment piece 44 pivoted to the upright 1, as indicated at 45, and having a tail piece 46. A stop piece 47 fixed to the tail piece 46. A stop piece 47 fixed to the upright interposes in the path of the movement of the members 44 and 46, respectively, to limit the set of the abutment piece 44 to either of two positions, the horizontal, which is the operative position, and the vertical, which is the idle position. In practice, the same blade 4 and the rail 3 being secured in operative relationship to each other, the supporting frame is adjusted to the rail in initial position by aid of the clamp 2. Afterward, the file being nicely adjusted to any one of the many positions required of it throughout its range of service, said positions varying to suit conditions applicable to different saws, the operator, having adjusted the collar 31 to a predetermined depth of cut may proceed confidently with his work of reciprocating the file until the file refuses to cut. This it will do as often as the stop lug 33 reaches its limit of movement through engagement with the stop piece 34 whose transverse extent interposes it in the path of the lug 33 throughout the extent of reciprocatory travel of the file.

What I claim is:

1. The combination with a supporting frame of an adjustable swinging arm provided with a series of apertures with a file carrier and means for securing it at will to any one of said apertures.

2. In a saw filer, the combination with a frame, of a file carrier comprising a rod reciprocatory within said frame, an adjustable collar provided with a stop lug on said rod, and a stop piece on the frame interposed in the path of the lug upon the collar.

3. In a saw filer, the combination with a supporting frame of an adjustable swinging arm pivotally attached thereto, and provided with a series of apertures, a file carrier frame, an arm pivotally attached thereto and adapted to be adjustably attached to said swinging arm by means of a bolt passing through one of the apertures, a rod reciprocatable within said file carrier frame, an adjustable collar provided with a stop lug on said rod, and a stop piece on the frame interposed in the path of the lug upon the collar.

4. The combination with a supporting frame of an adjustable swinging arm provided with a series of apertures, a file carrier provided with a ball-jointed arm, and means for securing said ball-jointed arm to any one of said apertures.

In testimony whereof I affix my signature in presence of two witnesses.

JAMES B. MULLAY.

Witnesses:
E. E. HECKBERT,
P. H. GETZ.

Copies of this patent may be obtained for five cents each, by addressing the "Commissioner of Patents, Washington, D. C."